United States Patent
Puppin

(10) Patent No.: US 6,531,010 B2
(45) Date of Patent: *Mar. 11, 2003

(54) THERMOPLASTIC RESIN AND FIBERGLASS FABRIC COMPOSITE AND METHOD

(75) Inventor: Giuseppe Puppin, Bayport, MN (US)

(73) Assignee: Andersen Corporation, Bayport, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/927,943

(22) Filed: Aug. 10, 2001

(65) Prior Publication Data

US 2002/0015820 A1 Feb. 7, 2002

Related U.S. Application Data

(60) Continuation of application No. 09/252,569, filed on Feb. 18, 1999, now Pat. No. 6,346,160, which is a division of application No. 08/829,531, filed on Mar. 28, 1997, now Pat. No. 5,948,505.

(51) Int. Cl.⁷ .............................................. B29C 47/02
(52) U.S. Cl. .......................... 156/88; 156/201; 156/203; 156/244.12; 156/244.13
(58) Field of Search ..................... 264/171.12, 171.13, 264/171.26, 171.27, 173.12; 156/196, 199, 203, 244.12, 244.13, 244.15, 88, 201

(56) References Cited

U.S. PATENT DOCUMENTS

| | | |
|---|---|---|
| 2,556,885 A | 6/1951 | Ness |
| 2,763,573 A | 9/1956 | Biefeld |
| 2,907,677 A | 10/1959 | Hochberg |
| 2,948,950 A | 8/1960 | Finger et al. |
| 2,956,917 A | 10/1960 | Fasano |
| 3,245,864 A * | 4/1966 | Shanok et al. ............... 161/106 |
| 3,493,461 A | 2/1970 | Sterman et al. |
| 3,895,896 A | 7/1975 | White |
| 4,128,369 A | 12/1978 | Kemerer et al. |
| 4,492,063 A * | 1/1985 | Schock et al. ............. 52/309.7 |
| 4,514,449 A | 4/1985 | Budich |
| 4,564,540 A | 1/1986 | Davies et al. |
| 4,640,065 A * | 2/1987 | Harris et al. ................... 52/204 |
| 4,681,722 A | 7/1987 | Carter |

(List continued on next page.)

FOREIGN PATENT DOCUMENTS

| | | | |
|---|---|---|---|
| DE | 1704 377 | 6/1971 | |
| DE | 43 41 521 A1 | 6/1995 | |
| DE | 195 19 484 A1 | 11/1996 | |
| EP | 0 113 209 | 7/1984 | |
| EP | 0 272 083 | 6/1988 | |
| EP | 0 285 705 | 10/1988 | |
| FR | 2 552 018 | 3/1985 | |
| WO | WO 9627701 A1 * | 9/1996 | ........... B29C/67/14 |

OTHER PUBLICATIONS

Kirk–Othmer Concise Encyclopedia of Chemical Technology, pp. 307–309.
Kirk–Othmer Encyclopedia of Chemical Technology, Third Edition, Supplement Volume, pp. 260–281.
BFG Fabric Information.

Primary Examiner—Michael W. Ball
Assistant Examiner—Gladys Corcoran
(74) Attorney, Agent, or Firm—Merchant & Gould P.C.

(57) ABSTRACT

The invention relates to a composite comprising a thermoplastic resin and a glass fabric that can be used in the form of a linear extrudate as a structural member or as a repair unit. The resin glass fiber composite structural member can be manufactured in an extrusion process. The linear extrudate can have a cross-section of any arbitrary shape or can be a regular geometric shape. The profile is made by first preforming the glass fabric into a useful shape, combining the preform fabric with melt resin and extruding the resin and glass fiber in a useful shape. When contacted with melt resin, the glass fiber becomes intimately contacted with and substantially coated with the melt resin.

10 Claims, 3 Drawing Sheets

U.S. PATENT DOCUMENTS

| | | | | |
|---|---|---|---|---|
| 4,762,751 A | * | 8/1988 | Girgis et al. | 428/375 |
| 4,769,199 A | | 9/1988 | Bemis et al. | |
| 4,788,088 A | | 11/1988 | Kohl | |
| 4,984,402 A | | 1/1991 | Davies | |
| 5,132,070 A | | 7/1992 | Paul et al. | |
| 5,229,056 A | | 7/1993 | De Meyer et al. | |
| 5,393,536 A | * | 2/1995 | Brandt et al. | 425/112 |
| 5,491,951 A | | 2/1996 | Riegelman | |
| 5,497,594 A | * | 3/1996 | Guiseppe et al. | 52/730.4 |
| 5,539,027 A | * | 7/1996 | Deaner et al. | 524/13 |
| 5,779,961 A | | 7/1998 | Teutsch | |
| 5,783,278 A | * | 7/1998 | Nishimura et al. | 139/11 |

* cited by examiner

THERMOPLASTIC RESIN AND FIBERGLASS FABRIC COMPOSITE AND METHOD

This application is a continuation of application Ser. No. 09/252,569, filed Feb. 18, 1999, now U.S. Pat. No. 6,346,160, which is a divisional of application Ser. No. 08/829,531, filed Mar. 28, 1997, now U.S. Pat. No. 5,948,505 which applications are incorporated herein by reference.

FIELD OF THE INVENTION

The invention relates to a composite material, comprising a thermoplastic resin and a glass fiber fabric, used for the fabrication of a structural member. Such a member can comprise a portion of or the entirety of any structural unit. Preferably the member can be used in the manufacture, reconstruction or repair of fenestration units such as windows or doors for residential and commercial architecture. More particularly, the invention relates to an improved composite material adapted to extrusion processing, and formed into structural members that have improved properties when used in windows and doors. The composite materials of the invention can be made to manufacture structural components such as tubes, rails, jambs, stiles, sills, tracks, siding, stop and sash, pipe, I-beams, H-beams, bar stock, angles, channels, tees, tubing, rods, zees, sheet stock plates, etc., nonstructural trim elements such as grid, cove, bead, quarter round, repair pieces, grills, etc.

BACKGROUND OF THE INVENTION

Structural materials have been made from composites comprising a resin and a reinforcing material such as a fiber, thread, yarn, roving, fabric or other such fibrous material. Such reinforcement materials have been used in a variety of applications. Conventional window and door manufacturers have commonly used wood and metal components in forming structural members. Commonly, residential windows are manufactured from milled wooden members, glass, screening fabric or extruded aluminum parts that are assembled to form typically double hung or casement units. Conventional glass-wooden windows while structurally sound, useful and well adapted for use in many residential installations, can deteriorate under certain circumstances. Conventional wood windows can also require painting and other periodic maintenance. Wooden and aluminum windows also suffer from cost problems related to the availability of suitable material for construction. Clear wood products are slowly becoming more scarce and are becoming more expensive as demand increases. Metal components are often combined with glass and formed into single unit sliding windows. Metal windows typically suffer from substantial energy loss during winter and summer months. Metal (Aluminum and ferrous metals), thermoplastic and wood materials can suffer from deterioration, (i.e.) rust, rot, photochemical deterioration, etc.

Extruded thermoplastic materials have also been used as non-structural components in window and door manufacture. Filled and unfilled thermoplastics have been extruded into useful seals, trim, weather-stripping, coatings and other window construction components. Thermoplastic materials such as polyvinyl chloride have been combined with wood members in manufacturing PERMASHIELD® brand windows manufactured by Andersen Corporation for many years. The technology disclosed in Zanini, U.S. Pat. Nos. 2,926,729 and 3,432,883, have been utilized in the manufacturing of plastic coatings or envelopes on wood or other structural members. Generally, the cladding or coating technology used in making PERMASHIELD® windows involves extruding a thin polyvinyl chloride coating or envelope surrounding a wood structural member.

Polyvinyl chloride has been combined with wood fiber to make extruded materials. Such materials have successfully been used in the form of a structural member that is a direct replacement for wood. These extruded materials have sufficient modulus, compressive strength, coefficient of thermal expansion to match wood to produce a direct replacement material. Typical composite materials have achieved a modulus greater than about 500,000 psi, an acceptable CTE, tensile strength, compressive strength, etc. to be useful. Deaner et al., U.S. Pat. Nos. 5,406,768 and 5,441,801, U.S. Ser. Nos. 08/224,396, 08/224,399, 08/326,472, 08/326,479, 08/326,480, 08/372,101 and 08/326,481 disclose a PVC/wood fiber composite that can be used as a high strength material in a structural member. This PVC/wood fiber composite has utility in many window and door applications.

Kirk-Othmer Encyclopedia of Chemical Technology and other such basic references contain a large proportion of information on the formation of composite materials which are defined as combinations of two or more materials present as separate phases combined to form desired structures. Typically, composites have fiber in some form combined with a continuous resin phase.

Oliveira, U.S. Pat. No. 4,110,510 teaches a PVC impregnated mesh having barium sulfate coated chlorinated polyethylene laminated to a sound deadening foam material.

Dost et al., U.S. Pat. No. 4,464,432 discloses a process for manufacturing porous textile substrates and teaches a impregnated substrate comprising fabric and a gelled thermoplastic under pressure to impregnate the fabric.

Schock et al., U.S. Pat. No. 4,492,063 discloses extruded plastic materials having glass fiber reinforced portions including fiberglass mat or fabric.

Bafford et al., U.S. Pat. No. 4,746,565 discloses a flame barrier comprising a face fabric laminated with a glass fabric coated with an encapsulated coating.

Wahl et al., U.S. Pat. No. 4,885,205 discloses a fiberglass mat or fabric impregnated with thermoplastic that is roughened or pretreated with a needle.

Amotta, U.S. Pat. No. 5,045,377 discloses a composite grid comprising a thermoplastic material is a grid format. The grid components can be reinforced with fiberglass yarn.

Laminates manufactured by interlayering fiber mat or glass fiber fabric with sheet-like thermoplastic materials have been known. The interlayered structures are often exposed to elevated temperatures and pressures to form a mechanically stable laminate structure.

The combination of a fiberglass mat or fabric with thermosetting components are disclosed in Biefeld, U.S. Pat. No. 2,763,573 and Daray, U.S. Pat. No. 5,455,090 and Fennebresque et al., U.S. Pat. No. 2,830,925.

A substantial and continuing need exists to provide a improved composite material (using resins or polymers comprising vinyl chloride and polymers having no chloride containing monomer components) that can be made of thermoplastic resin or polymer and a reinforcing fiber component. A further need exists for a composite material that can be extruded into a shape that is a direct substitute for the equivalent structural member milled shape in a wood or metal structural member. A thermoplastic resin having fiber or fabric compatibility, good thermal properties and good structural or mechanical properties is required. This need also requires a composite with a coefficient of thermal expansion that approximates wood, that can be extruded into reproducible stable dimensions, a high modulus, a high tensile strength, a high compressive strength, a low thermal transmission rate, an improved resistance to insect attack and rot while in use and a hardness and rigidity that permits sawing, milling, and fastening (nail, screw, staple or glue) retention comparable to wood members.

BRIEF DISCUSSION OF THE INVENTION

We have found that the problems relating to forming a structural member or cooperative structural member or a substitute for wood or metal structural members can be solved by forming a thermoplastic resin/glass fabric composite material into a shaped structural member. A large variety of resins have been provided over the last few years. These resins are available in a variety of grades, molecular weights, melting points, formulations, containing materials of great variability. We have found that not every thermoplastic resin is useful in the manufacture of glass fabric composites. The resin must be compatible in the melt form with glass fabric to form a high strength composite. The glass fabric must be fully wetted and penetrated, in its woven structure, with the thermoplastic to form a high strength composite material. Further, the thermoplastic resin must have thermal properties (melt flow properties or mp<210° C.) that permit successful composite manufacture. Lastly, the resin fiber fabric composite should have high temperature stability and should provide sufficient structural properties to the composite material to be successful in structural application within a range of typical temperatures. Even in bright direct sunlight a dark pigmented unit should not lose the profile shape or related properties.

We have also found that the successful manufacture of structural members for windows and doors requires the preliminary shaping of the glass fabric into a preformed shape conforming to an extrusion die used in forming the profile. Combining the preformed fabric and resin in the die results in the intimate contact of the resin with the fabric. We have further found that modifying the edges of the fabric, when each edge is exposed to resin under pressure results in an improved materials. We have found that introducing a fold or overlap modification into the edge stabilizes and strengthens the edge and prevents fraying or other edge deterioration. We have found that the intimate mixing of the resin, fiberglass fabric results in a product that is uniquely adapted to the extrusion manufacture of resin/fabric components and achieves the manufacture of a useful structural member replacement product. For the purpose of this patent application, the term "shape" indicates that the flat (planar) sheet-like glass fabric is changed from the planar structure from the take off roll, into a non-planar structure. Such non-planar structures can include the introduction of an angle from one fabric surface to another that can range from about 0° or 1° through a 180° to a 360° angle. An angle of about 0° or about 360° indicates a fold where the glass fiber is folded back on the adjacent fabric. Additional common angles include 45° angles, 90° angles, 135° angles, 180° angles, 270° angles, etc. Further, the shape can include smooth curves such as substantially curved surfaces, a relatively small curved surface included with a substantially planar surface, a rolled edge, a wholly included circular shape introduced into the extruded part, etc. The shape can also include relatively complex profiles having one or more angles, one or more curved surfaces, one or more folded or rolled edges, or more areas where the fabric is folded back and doubled up with two or more folds, at an edge or at an interior location. Further, other closed surfaces can be formed in the extrusion of the fabric. For example, a circular, oval, square, rectangular or triangular shape can be introduced into the folded glass fabric, covered with rigid or semi-rigid polyvinyl chloride resulting in a desired enclosed shape or profile. The purpose of introducing a particular shape or profile into the glass fiber is to conform the glass fiber to an extrusion die wherein the glass fiber is incorporated with thermoplastic resulting in a desired profile shape that can be used in a fenestration, window or door unit. The extruded material can contain one, two or more glass fabric sheets and can contain other fabrics such as metal, Kevlar®, nylon, etc.

BRIEF DISCUSSION OF THE DRAWINGS

FIG. 1 includes a fabric source, a resin source, a combining head, one or more calibration blocks and a cooling bath.

Figure 3:
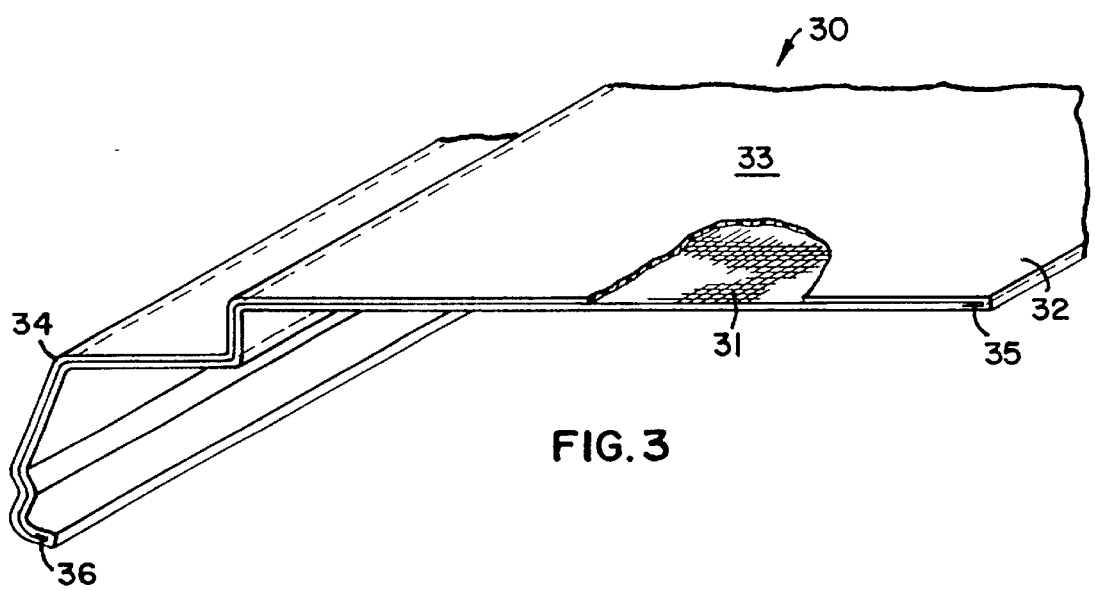

FIG. 3 is a view of a composite structure made using the materials and methods of the invention. The shape in FIG. 3 is conformed to fit a sill common in many residential window units. The FIG. 3 shape can be fit onto such a sill and fastened in place to repair either structural or cosmetic defects.

Figure 4:
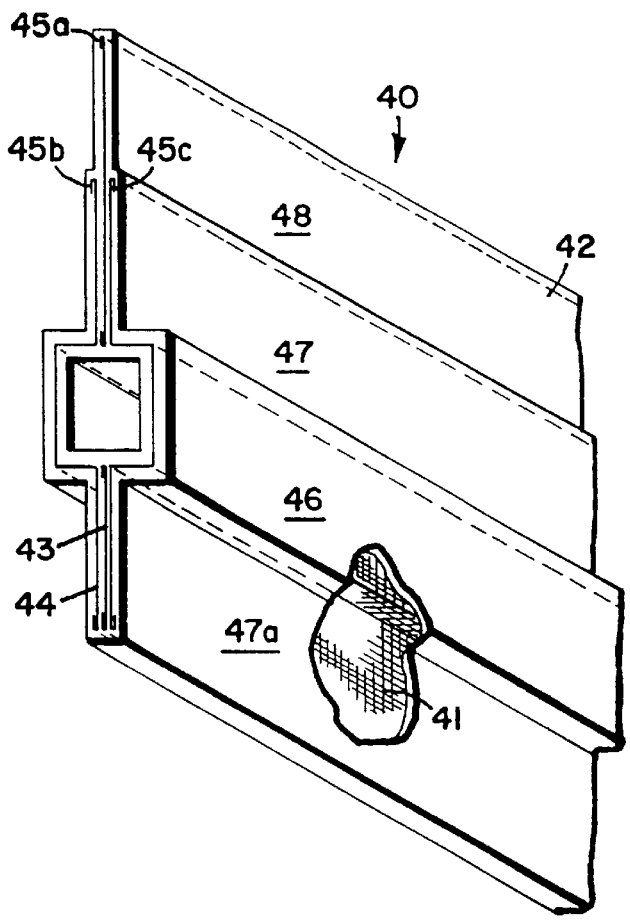

FIG. 4 is a structural member used in the manufacture of sliding windows. The structure requires substantial rigidity and strength to withstand use stress.

Figure 5:
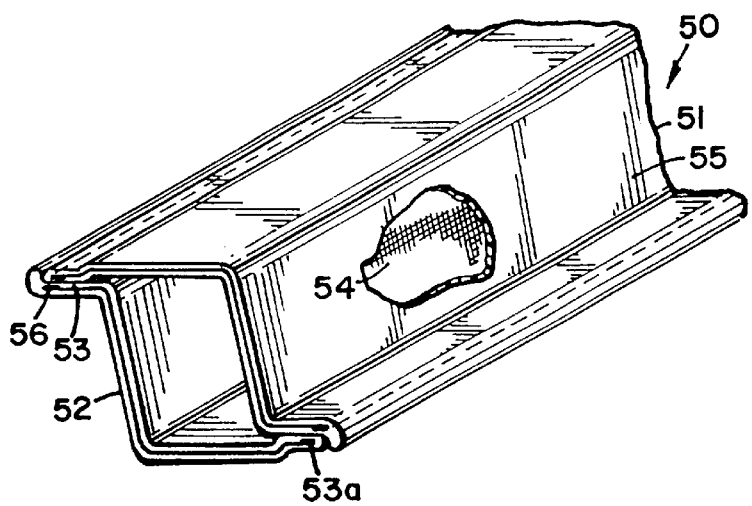

FIG. 5 is a complex structural shape using the composite materials of the invention.

Figure 6:
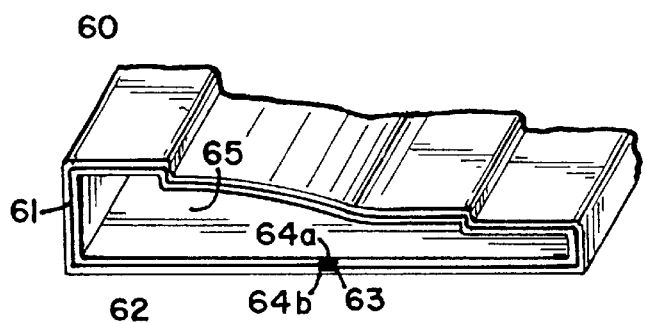

FIG. 6 is a linear hollow molding exterior trim piece used in the installation of windows or other units.

Figure 7A:
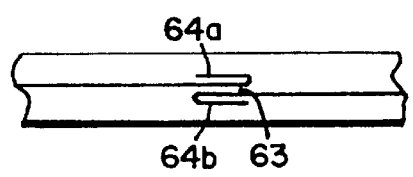

FIG. 7a is a view of an enlarged fragment portion of the area of overlap, in a portion of FIG. 6, of the folded edges of the fiberglass fabric in the resin matrix.

Figure 7B:
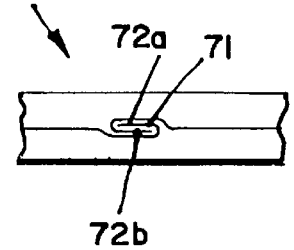

FIG. 7b is a view of an alternate enlarged fragment portion of the area of overlap, in a portion of FIG. 6, of the interlocked folded edges of the fiberglass fabric in the resin matrix.

Figure 8:
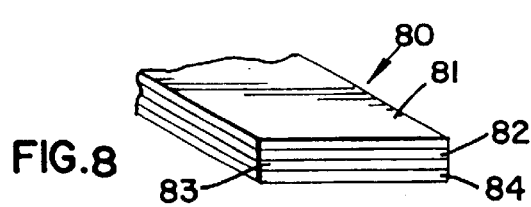

FIG. 8 is a representation of a structural member comprising a multi-fabric layer resin composite. The figure displays a cutaway showing the internal structure of the layers of fabric and resin.

DETAILED DESCRIPTION OF THE INVENTION

The invention relates to the use of a thermoplastic resin and continuous glass fiber fabric material wherein the fabric is intimately contacted and wetted by the resin and organic materials and the resin is incorporated into the fabric. The intimate contact and wetting between the components in the extrusion process ensures high quality physical properties in the extruded composite materials after manufacture.

The thermoplastic resin and fabric can be combined and formed into a structural member using a thermoplastic extrusion process. Structural member formation is an important step in composite manufacture. During the extrusion process for the resin/fabric composite, the resin and fabric are intimately contacted at melt temperatures and pressures to insure that the fabric and polymeric material are wetted, combined and extruded in a form such that the polymer material, on a microscopic basis, coats and flows into the pores, cavity, etc., of the fabric.

The linear extrudate of the invention is made by extrusion of the thermoplastic resin and fabric in composite form through an extrusion die resulting in a linear extrudate that can be formed into a convenient shape and cut into useful lengths. The cross-section can be any open or closed arbitrary shape depending on the extrusion die geometry as discussed above.

We have found that the interaction, on a microscopic level, between the resin and the fabric, in one, two or more layers or plies of fabric, is an important element of the invention. The physical properties of an extruded member are improved when the polymer melt during extrusion of the pellet or linear member thoroughly wets and penetrates the fiber in the fabric. The thermoplastic material comprises an exterior continuous organic resin phase covering and intimately associated with fiber/fabric. This means, that any pore, crevice, crack, passage way, indentation, etc., in the warp and weft is fully filled by thermoplastic material. Such penetration as attained by ensuring that the viscosity of the resin melt is reduced by operations at elevated temperature and the use of sufficient pressure to force the polymer into the available internal pores in and on the surface of the fiber or fabric. During the linear extrudate manufacture, substantial work is done in providing a uniform introduction of resin into fabric.

Important Polymer Characteristics

Not every thermoplastic resin is useful in the composite materials of the invention. First the thermoplastic resin must be compatible with the glass fiber. Resins that are not compatible with the glass fabric fiber will not sufficiently wet the fiber and fabric to intimately bond and penetrate the fiber to obtain sufficient engineering properties.

Compatible resins can be tested by combining resin and glass fiber at typical melt extrusion temperatures and examining the interface between the polymer material and glass fiber after the composite is cooled. Compatible fibers will form intimate bonds with the glass fabric and will have no void portions where the glass fiber is not contacted by resin. Non-compatible resins can have reduced penetration into the glass fibers or can have insufficient chemical compatibility to adhere to the glass fiber in the fabric. The result of the incompatibility will be the formation of voids in large or small sections and poor wetting of the fiber. Compatible resins will quickly and easily flow into the fabric and wet the glass fiber incorporating the resin into all fabric openings. Resin to fabric compatibility can be increased using a precoated fabric. For example, a thin PVC coating can improve PVC resin to fabric adhesion. To some degree, the lack of compatibility between the resin melt and the fiber can also be overcome by increasing the pressure the melt resin is introduced into the dye with the fabric. Pressure can overcome the incompatibility of the melt resin and the fiber and can force the materials together. Pressure can force wetting and incorporation of the resin into the fiberglass mat to form a fully combined composite resin fabric material.

Further, we have found that the thermoplastic resin must have sufficient viscosity at a processing temperature substantially less than the decomposition temperature of glass fabric fiber. Accordingly, the processing temperature of the thermoplastic material must be substantially less than about 450° F. (340° C.) preferably between 180 and 240° C. Lastly, after the thermoplastic material is manufactured by combining the thermoplastic resin and the fabric, the resulting composite has a modulus greater than about 500,000 psi, preferably greater than 800,000 psi and can attain a modulus of $1.3 \times 10^6$ psi or more.

Vinyl Polymers

A large variety of vinyl polymeric materials can be used in the composite materials of the invention.

A preferred vinyl polymer, a polyvinyl chloride homopolymer, a copolymer of vinyl chloride and a second monomer and a polymeric alloy having at least two vinyl polymers, at least one polymer containing repeating units comprising vinyl chloride.

Polyvinyl chloride is a common commodity thermoplastic polymer. Vinyl chloride monomer is made from a variety of different processes such as the reaction of acetylene and hydrogen chloride and the direct chlorination of ethylene. Polyvinyl chloride is typically manufactured by the free radical polymerization of vinyl chloride resulting in a useful thermoplastic polymer. After polymerization, polyvinyl chloride is commonly combined with thermal stabilizers, lubricants, plasticizers, organic and inorganic pigments, fillers, biocides, processing aids, flame retardants, and other commonly available additive materials. Polyvinyl chloride can also be combined with other vinyl monomers in the manufacture of polyvinyl chloride copolymers. Such copolymers can be linear copolymers, branched copolymers, graft copolymers, random copolymers, regular repeating copolymers, block copolymers, etc. Monomers that can be combined with vinyl chloride to form vinyl chloride copolymers include an acrylonitrile; alpha-olefins such as ethylene, propoylene, etc.; chlorinated monomers such as vinylidene dichloride; acrylate monomers such as acrylic acid, methylacrylate, methylmethacrylate, acrylamide, hydroxyethyl acrylate, and others; styrenic monomers such as styrene, alphamethyl styrene, vinyl toluene, etc.; vinyl acetate; and commonly available ethylenically unsaturated monomer compositions.

Such monomers can be used in an amount of up to about 50 mol-%, the balance being vinyl chloride. Polymer blends or polymer alloys can be used in the pellet process of this invention. Such alloys typically comprise two miscible polymers blended to form a uniform composition. Scientific and commercial progress in the area of polymer blends has lead to the realization that important physical property improvements cannot be made by developing new polymer material by forming miscible polymer blends or alloys. A polymer alloy at equilibrium comprises a mixture of two amorphous polymers existing as a single phase of intimately mixed segments of the two macro molecular components. Miscible amorphous polymers form glasses upon sufficient cooling and a homogeneous or miscible polymer blend exhibits a single, composition-dependent glass transition temperature ($T_g$). Immiscible or non-alloyed blend of polymers typically displays two or more glass transition temperatures associated with immiscible polymer phases. In the simplest cases, the properties of polymer alloys reflect a composition weighted average of properties possessed by the components. In general, however, the property dependence on composition varies in a complex way with a particular property, the nature of the components (glassy, rubbery or semi-crystalline), the thermodynamic state of the blend, and its mechanical state whether molecules and phases are oriented. Polyvinyl chloride forms a number of known polymer alloys including, for example, polyvinyl chloride/nitrile rubber; polyvinyl chloride and related chlorinated copolymers and terpolymers of polyvinyl chloride or vinylidene dichloride; polyvinyl chloride/α-methyl styrene-acrylonitrile copolymer blends; polyvinyl chloride/polyethylene; polyvinyl chloride/chlorinated polyethylene; and others.

The primary requirement for the substantially thermoplastic polymeric material is that it retain sufficient thermoplastic properties to permit melt blending with wood fiber, permit formation of linear extrudate pellets, and to permit the composition material or pellet to be extruded or injection molded in a thermoplastic process forming a rigid structural member. Polyvinyl chloride homopolymers, copolymers and polymer alloys are available from a number of manufacturers including B. F. Goodrich, Vista, Air Products, Occidental Chemicals, etc. Preferred polyvinyl chloride materials are polyvinyl chloride homopolymer having a molecular weight (Mn) of about 90,000±50,000, most preferably about 88,000±10,000. The preferred polyvinyl chloride has a bulk density of approximately 0.71 gm/cc±0.1 gm/cc.

Another class of thermoplastic include styrenic copolymers. The term styrenic copolymer indicates that styrene is copolymerized with a second vinyl monomer resulting in a vinyl polymer. Such materials contain at least a 5 mol-% styrene and the balance being 1 or more other vinyl monomers. An important class of these materials are styrene acrylonitrile (SAN) polymers. SAN polymers are random amorphous linear copolymers produced by copolymerizing styrene acrylonitrile and optionally other monomers. Emulsion, suspension and continuous mass polymerization techniques have been used. SAN copolymers possess transparency, excellent thermal properties, good chemical resistance and hardness. These polymers are also characterized by their rigidity, dimensional stability and load bearing capability. Olefin modified SAN's (OSA polymer materials) and acrylic styrene acrylonitriles (ASA polymer materials) are known. These materials are somewhat softer than unmodified SAN's and are ductile, opaque, two phased terpolymers that have surprisingly improved weatherability.

ASA resins are random amorphous terpolymers produced either by mass copolymerization or by graft copolymerization. In mass copolymerization, an acrylic monomer styrene and acrylonitrile are combined to form a heteric terpolymer. In an alternative preparation technique, styrene acrylonitrile oligomers and monomers can be grafted to an acrylic elastomer backbone. Such materials are characterized as outdoor weatherable and UV resistant products that provide excellent accommodation of color stability property retention and property stability with exterior exposure. These materials can also be blended or alloyed with a variety of other polymers including polyvinyl chloride, polycarbonate, polymethyl methacrylate and others. An important class of styrene copolymers includes the acrylonitrile-butadiene-styrene monomers. These resins are very versatile family of thermoplastic resins produced by copolymerizing the three monomers. Each monomer provides an important property to the final terpolymer material. The final material has excellent heat resistance, chemical resistance and surface hardness combined with processability, rigidity and strength. The polymers are also tough and impact resistant. The styrene copolymer family of resins have a melt index that ranges from about 0.5 to 25, preferably about 0.5 to 20.

An important class of resins that can be used in the composites of the invention include acrylic resins. Acrylics comprise a broad array of polymers and copolymers in which the major monomeric constituents are an ester acrylate or methacrylate. These resins are often provided in the form of hard, clear sheet or pellets. Acrylic monomers polymerized by free radical processes initiated by typically peroxides, azo compounds or radiant energy. Commercial polymer formulations are often provided in which a variety of additives are modifiers used during the polymerization provide a specific set of properties for certain applications. Pellets made for resin grade applications are typically made either in bulk (continuous solution polymerization), followed by extrusion and pelleting or continuously by polyermization in an extruder in which unconverted monomer is removed under reduced pressure and recovered for recycling. Acrylic plastics are commonly made by using methyl acrylate, methylmethacrylate, higher alkyl acrylates and other copolymerizable vinyl monomers. Preferred acrylic resin materials useful in the composites of the invention has a melt index of about 0.5 to 50, preferably about 1 to 30 gm/10 min.

Vinyl polymer resins include a acrylonitrile; alpha-olefins such as ethylene, propylene, etc.; chlorinated monomers such as vinylidene dichloride, acrylate monomers such as acrylic acid, methylacrylate, methylmethacrylate, acrylamide, hydroxyethyl acrylate, and others; styrenic monomers such as styrene, alphamethyl styrene, vinyl toluene, etc.; vinyl acetate; and other commonly available ethylenically unsaturated monomer compositions.

| RESIN PARAMETERS | | |
|---|---|---|
| | USEFUL | PREFERRED |
| PROCESS TEMPERATURE | T < 250° C. | 150°–210° C. |
| FLEX MODULUS* (RESIN Only) | >200,000 | >300,000 |

Condensation Polymer Resins

Condensation polymer resins that can be used in the composite materials of the invention include polyamides, polyamide-imide polymers, polyarylsulfones, polycarbonate, polybutylene terephthalate, polybutylene naphthalate, polyetherimides, polyethersulfones, polyethylene terephthalate, thermoplastic polyimides, polyphenylene ether blends, polyphenylene sulfide, polysulfones, thermoplastic polyurethanes and others. Preferred condensation resins include polycarbonate materials, polyphenyleneoxide materials, and polyester materials including polyethylene terephthalate, polybutylene terephthalate, polyethylene naphthalate and polybutylene naphthalate materials.

Polycarbonate resins are high performance, amorphous thermoplastic resins having high impact strength, clarity, heat resistance and dimensional stability. Polycarbonates are generally classified as a polyester or carbonic acid with organic hydroxy compounds. The most common polycarbonates are based on phenol A as a hydroxy compound copolymerized with carbonic acid. Materials are often made by the reaction of a bisphenol A with phosgene ($COCl_2$). Polycarbonates can be made with phthalate monomers introduced into the polymerization extruder to improve properties such as heat resistance, further trifunctional materials can also be used to increase melt strength or extrusion blow molded materials. Polycarbonates can often be used as a versatile blending material as a component with other commercial polymers in the manufacture of alloys. Polycarbonates can be combined with polyethylene terephthalate acrylonitrile-butadiene-styrene resins, styrene maleic anhydride resins and others. Preferred alloys comprise a styrene copolymer and a polycarbonate. Preferred melt for the polycarbonate materials should be indices between 0.5 and 7, preferably between 1 and 5 gms/10 min.

A variety of polyester condensation polymer materials including polyethylene terephthalate, polybutylene terephthalate, polyethylene naphthalate, polybutylene naphthalate, etc. can be useful in the resin glass fabric fiber thermoplastic composites of the invention. Polyethylene terephthalate and polybutylene terephthalate are high performance condensation polymer materials. Such polymers often made by a copolymerization between a diol (ethylene glycol, 1,4-butane diol) with dimethyl terephthalate. In the polymerization of the material, the polymerization mixture is heated to high temperature resulting in the transesterification reaction releasing methanol and resulting in the formation of the condensate material. Similarly, polyethylene naphthalate and polybutylene naphthalate materials can be made by copolymerizing as above using as an acid source, a naphthalene dicarboxylic acid. The naphthalate thermoplastics have a higher $T_g$ and higher stability at high temperature compared to the terephthalate materials. However, all these polyester materials are useful in the composite structural materials of the invention. Such materials have a preferred molecular weight characterized by melt flow properties. Useful polyester materials have a viscosity at 265° C. of about 500–2000 cP, preferably about 800–1300 cP.

Polyphenylene oxide materials are thermoplastic resins that are useful at temperature ranges as high as 330° C. Polyphenylene oxide has excellent mechanical properties, dimensional stability, and dielectric characteristics. Commonly, phenylene oxides are manufactured and sold as polymer alloys or blends when combined with other polymers or fiber. Polyphenylene oxide typically comprises a homopolymer of 2,6-dimethyl-1-phenol. The polymer commonly known as poly(oxy-(2,6-dimethyl-1,4-phenylene)). Polyphenylene is often used as an alloy or blend with a polyamide, typically nylon 6-6, alloys with polystyrene or high impact styrene and others. A preferred melt index (ASTM 1238) for the polyphenylene oxide material useful in the invention typically ranges from about 1 to 20, preferably about 5 to 10 gm/10 min. The melt viscosity is about 1000 at 265° C.

Polymer blends or polymer alloys can be useful in manufacturing the linear extrudate of the invention. Such alloys typically comprise two miscible polymers blended to form a uniform composition. Scientific and commercial progress in the area of polymer blends has lead to the realization that important physical property improvements can be made not by developing new polymer material but by forming miscible polymer blends or alloys. A polymer alloy at equilibrium comprises a mixture of two amorphous polymers existing as a single phase of intimately mixed segments of the two macro molecular components. Miscible amorphous polymers form glasses upon sufficient cooling and a homogeneous or miscible polymer blend exhibits a single, composition dependent glass transition temperature ($T_g$). Immiscible or non-alloyed blend of polymers typically displays two or more glass transition temperatures associated with immiscible polymer phases. In the simplest cases, the properties of polymer alloys reflect a composition weighted average of properties possessed by the components. In general, however, the property dependence on composition varies in a complex way with a particular property, the nature of the components (glassy, rubbery or semi-crystalline), the thermodynamic state of the blend, and its mechanical state whether molecules and phases are oriented.

The primary requirement for the substantially thermoplastic resin material is that it retain sufficient thermoplastic properties to permit melt blending with glass fabric fiber, permit formation of linear coated members, and to permit the composition material to be extruded in a thermoplastic process forming the rigid structural member. Thermoplastic resin and resin alloys are available from a number of manufacturers including B.F. Goodrich, G.E., Dow, and DuPont.

The composite of the invention comprises a woven or non-woven glass fiber fabric which has preferably been given a protective coating to coat individual glass fibers, yarns, etc. Suitable woven glass fiber fabrics include fabrics having a plain weave, a basket weave, a twill weave, a crowfoot satin or long shaft satin weave. Suitable knit fabrics include warp knits and weft knits. Non-woven glass fabrics are also suitable but not preferred. The construction of the fabric should not be such that the composite, whether or not prelaminated, precoated or preprocessed, results preventing breakage, splitting or bending of any of the individual glass fibers, past a mechanical yield point, prior to non-woven fabric formation. Fabric weights from about 0.5 to about 10 ounces per square yard are suitable. The preferred fabric for the purpose of this invention comprises a glass fiber fabric having a PVC, acrylic or acrylate coating. The preferred glass fabric is a plain weave fabric having about 5–20, preferably about 7–12 ounces of fabric per square yard. The fabric typically includes about 10 to 30 bundles of fiber per each square inch (known in the fabric industry as "10–30 pick") in the fabric here each bundle contains about 40 to about 5,000 glass strands typically 200 to 1000 strands.

Fabrics can be made from individual glass fibers, individual yarns, collections of 2 to greater than 100 individual fibers, tows, yarns or other collections. Further, the fabrics can contain non-glass fibers such as carbon fiber, Kevlar® fiber, metal fibers or other high performance fiber having a tensile strength approximating or greater than that of glass fiber. Such fibers can be included in a glass fiber yarn or tow or can be individually introduced into the woven or non-woven fabric at random in either the warp or weft or both. In the manufacture of non-woven fabrics, the non-woven fabric can be a single layer of randomly distributed glass fiber or yarn or multilayer laminates of fiber or yarn distribution fabrics. Such non-woven fabrics can also include non-glass fiber incorporated with the glass fiber or between the glass fiber laminations. The glass fiber is preferably coated to encapsulate the glass in a coating. The coating increases the wetability (adjust the surface area) of the glass fiber to tender the materials more compatible or wetable with the synthetic resin or resin blend. Typical coating compositions generally contain a polymeric binder material combined with a filler, a fire retardant additive, a pigment or a plasticizer, or other other typical fabric additive material. Typical binders include polymeric materials that can be dissolved or suspended in aqueous diluents including emulsion polymers such as polyvinyl chloride, polyurethane polymers, acrylic materials, ethylene/vinyl chloride copolymers, vinylidene chloride/alkylmethacrylate copolymers, vinyl chloride/vinylacetate copolymers, neoprene brand (isoprene or chloroprene) polymers, vinylacetate/alkylacrylate copolymers or any known combination thereof. Typical filler materials are commonly inorganic and include clay, calcium carbonate, talc or titanium dioxide. Fire retardant additives include chlorine containing polymers, antimony trioxide, antimony pentaoxide, aluminum trihydrate and decabromodiphenyloxide. Depending on the selection of polymeric binder, a plasticizer may be incorporated into the composition to maximize flexibility of the coated glass fabric. A wide variety of organic plasticizers are suitable and known for obtaining a flexible coating. A large number of clear plasticizers are known. The coating is commonly applied to the glass fabric as liquid coating or a collapsible foam that can penetrate the glass fiber yarns to ensure that each glass fiber is fully coated. Suitable methods for applying a liquid coating include tank coating, gravure coating, a reverse role coating, knife over roll coating, knife over table coating, floating knife methods, dip coating or pad/nip coating. The coating technique is not critical as long as each glass fiber is substantially coated or encapsulated. The amount of coating applied to the glass fibers can range from about 5 to about 95 wt % based on the coated glass fiber, preferably about 8 to 30 wt % based on the weight of the glass fiber. The coating on the fiber material can comprise one, two or more of a similar or diverse coating. A second or third coating can comprise a primer coating optimizing wetability of the glass fiber by the polymer material. Such primers include organo silanes, organo titanates, polyurethane coatings, etc.

| RESIN/FABRIC COMPOSITE PARAMETERS | | |
|---|---|---|
| | USEFUL | PREFERRED |
| FLEX MODULUS* | >500,000 | >700,000 |
| COEFFICIENT OF THERMAL EXPANSION | <2.5 × $10^{-5}$ in/in-° F. | <1.5 × $10^{-6}$ in/in-° F. |
| HEAT DISTORTION TEMPERATURE | T > 95° C. | T > 105° C. |
| IMPACT ENERGY - SINGLE LAYER GLASS COMPOSITE | >4 in-lb | about 10 to 35 in-lb |

Composite Manufacture

In the manufacture of the composition of the invention, the manufacture and procedure requires two important steps. A first fabric preform step and a second resin/fabric extrusion step.

During the preform step, the glass fabric or two or more fabric or glass plies is formed into an appropriate shape prior to combination with the appropriate resin material. We have found that the preform step shapes the glass fiber into a shape that is substantially the same as the shape required in the final structural member. An important preform step is the introduction of an edge fold along the lateral edge of the fabric as it passes into the die. The folded fabric can also have any arbitrary shape. Such a shape can include a simple angle such as a 90° angle, a 135° angle, a 45° angle or other such angle. Further, the preformed shape can be a simple or complex curve having one, two or more diameters. The curves can be convex on one side and concave on that same side. Further, the glass fiber can be formed into a closed surface having a triangular, square, rectangular, circular, oval, hexagonal, heptagonal or other cross-section. The glass fabric can be formed into virtually any arbitrary shape conforming to the end use.

Such shapes can conform to a circular or oval cross-section tube, a rail, a quarter-round, half-round or other shape, a jamb a hollow or filled style, a sill having portions of the linear extrudate shaped to the form of a double hung member, a track shape having a passageway for one, two or more units such as a track for a double hung window, a sliding glass door, etc. The member can comprise stop or sash members or can comprise portions that are non-structural trim elements such as grill, cove, bead, quarter-round, repair pieces, etc. Such a preshaping step is typically accomplished by interposing a shaping member between the source of fabric and the extrusion die that contacts the melt polymer with the glass fabric. Such a shaping die can comprise a simple die which forms the glass fabric into an appropriate shape or can comprise a series of dies that slowly conforms the glass into an appropriate shape for combination with the melt polymer. Such a step wise confirmation of the fabric into the appropriate shape can be done smoothly with a smoothly changing surface that conforms the glass into an appropriate shape. Further, such a preforming step can be done in discrete stages in which the glass fabric passes through two, three or more shaping stages resulting in the formation of a final profile product.

An important preforming step with respect to forming a stable useful strong composite involves introducing a fold into an edge on the exposed fiber. We have found fabric, as is common to virtually all fabric, can fray at an edge. This fraying is commonly made worse by application of a flow of resin against the exposed fabric edge disrupting the warp and weft of the fabric. The frayed edges can have randomly oriented fiber and can have fiber removed from the weave resulting in a poorly formed edge with unsatisfactory geometry. Such problems can be solved by introducing a fold into each edge of the fabric. Typically, the edges folded are the lateral edges in the sense that the edges are on the sides of materials as they are incorporated into the extrusion machines. The leading edge and following edges are often not folded during operations, only the lateral edges are exposed to the effects of melt resin. A single fold can be used, however, a double fold or triple fold can be used resulting in a structure having two, three, four or more layers of fabric in the fold. The fold width, measured from the lateral edge of the fold can be approximately 0.1 to 5 centimeters, preferably about 0.2 to 3 centimeters. The folding or preforming can be done in one or more stations or steps. We have found that prefolding the fabric prior to the introduction of melt fiber results in a strengthened edge and an edge in which the folded materials, incorporated with resin are strong, resilient and resist mechanical stress. The prefold can be achieved using a preforming die that folds the edges over. Such a die can be installed before or after the preshaping die shown in FIG. 2. Alternatively, the fold and preshape step is done in a single tool.

The preferred equipment for combining fabric and melt polymer and extruding the composite of the invention is an industrial extruder device. Such extruders can be obtained from a variety of manufacturers including Cincinnati Millicron, etc. The extruder used to combine melt resin and fabric can contact opposite sides of the shaped fabric with resin. However, for certain applications, the single or twin screw extruder can introduce the resin into only one side of the fabric recognizing that the pressure of the contact will tend to force the melt resin into and through the fabric resulting in some resin covering all fiber surfaces.

The fabric and polymer is fed to the extruder at a rate such that the composite can comprise from about 1 to 50 wt % of fabric and 50 to 99 wt % resin. Preferably, about 10 to 20 wt % fabric is combined with 80 to 90 wt % of resin. The resin feed is commonly in a small particulate size which can take the form of flake, pellet, powder, etc.

Resin and fabric are then contacted in appropriate proportions in the extruder die and simultaneously introduced into the mixing station at appropriate feed ratios to ensure appropriate product composition.

In a preferred mode, the fabric is placed in a shape preform section. The resin is introduced into a powder or pellet resin input system. The amount of resin and fabric are adjusted to ensure that the composite material contains appropriate proportions on a weight or volume basis. The shaped fabric is introduced into an extrusion die device. The extrusion die device has a mixing section, a transport section and melt section in the resin. Each section has a desired heat profile resulting in a useful product. The materials are introduced into the extruder at a rate of about 60 to about 1400 pounds of material per hour and are initially heated to a temperature that can maintain an efficient melt flow of resin. A multistage device is used that profiles processing temperature to efficiently combine fabric and resin. The final stage of extrusion comprises a contact where fabric and fiber are intimately contacted and combined.

Detailed Discussion of the Drawings

Figure 1:
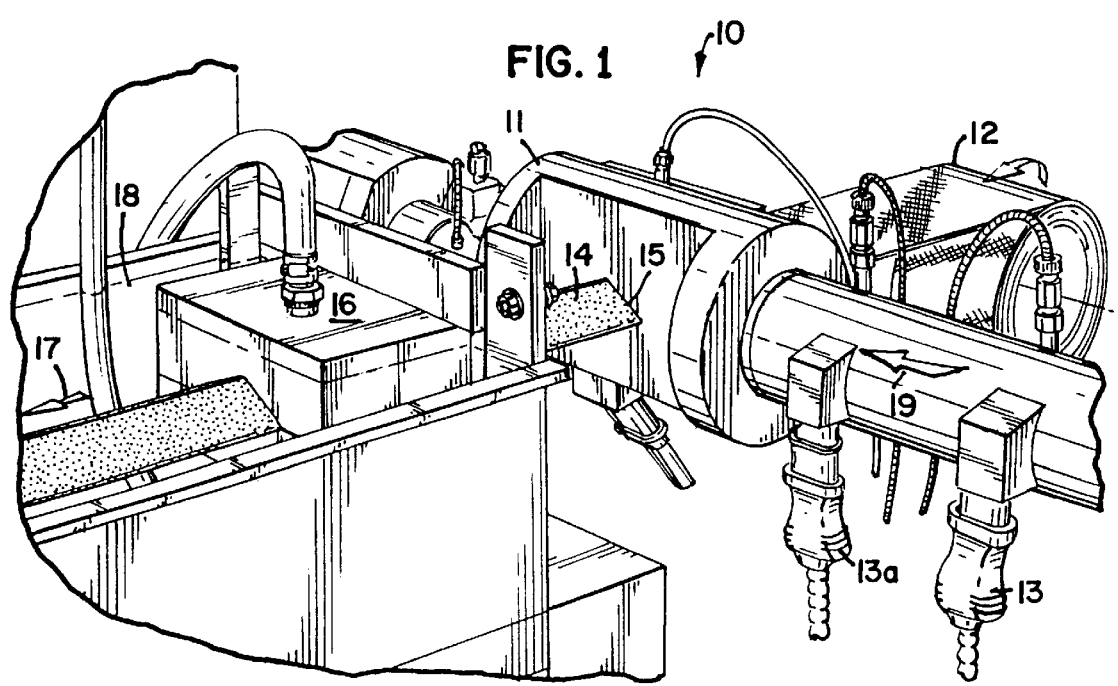
FIG. 1 is a view of the overall extrusion equipment used to make the resin fabric composite of the invention.

FIG. 1 shows an overall apparatus used for forming the resin fabric composite of the invention. The device 10 generally shows an extruder head 11 in which fabric and resin are combined under conditions of temperature and pressure sufficient to incorporate the resin into the fabric. Fabric is provided from fabric source 12, typically a rolled cylinder of fabric. Fabric is introduced into the extrusion head 11 wherein it is combined with melt resin. Melt resin 19 is introduced into the extrusion head 11 through an extrusion apparatus heated using heaters 13 and 13a. The fabric is preformed (shaped or folded) into a desired shape using a preforming or folding shaping surface (not shown). The fabric enters the die through an entry aperture (not shown). In the extruder head 11, resin is combined with fabric. The composite 14 comprising fabric and hot resin exits the die at die exit 15. The surfaces of the fabric are contacted with melt resin in the extruder head on one or both sides from supply channels formed in the extruder device. The dimensions of the extruder die gates are modified to ensure that every part of the fabric is contacted with appropriate amounts of resin. The peripheral edges typically have greater dimensions to ensure the melt resin can flow and wet the periphery of the fabric. In particular, the folded edges of the fabric require sufficient resin to form into a rigid use folded edge. The internal components of the die are not shown. After exiting the die at exit 15, the hot resin fabric composite is directed into a calibration block 16 that ensures the continuous composite profile shape is exact within required tolerances. Such vacuum calibration blocks are commonly available in the industry. These blocks reduce the temperature of the composite such that the constant dimensions are maintained as the composite enters a cooling bath 17. The cooling bath is typically filled with water to a level 18. The flow of cooling water in the water bath reduces the temperature of the composite to approximately ambient temperature.

Figure 2:
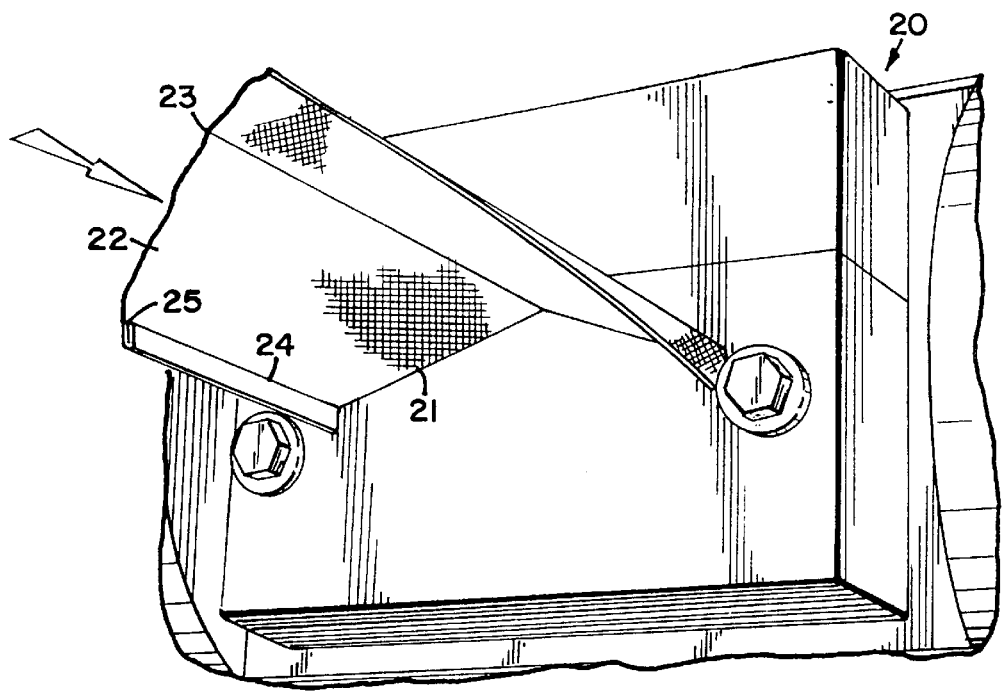
FIG. 2 is a view of a preshaping tool in which a glass fabric is formed and folded into a shape that corresponds in shape to the die in which fabric and resin are combined.

FIG. 2 is a view of an apparatus that introduces a desirable shape into the glass fiber prior to combination with the melt resin. In FIG. 2 the apparatus 20 that introduces the preformed shape 21 into the fiber 22 is shown. The flat unshaped fabric (not shown) is fed directly into the apparatus inlet 21 at which time the fabric takes on a shape fixed by the dimensions of the inlet. The inlet 21 is sized in dimension to correspond to the thickness of the fabric leaving less than 0.015 inch clearance upon entry. The shape introduced into the fabric 22 includes a central angle 23 of approximately 135° and two substantially identical peripheral angles 24 of approximately 115°. The prefolded edge 25 of the fabric is also shown. The forming apparatus 20 contains no introduction point ports adapted for melt resin and is merely a preshaping apparatus for the fabric. Immediately downstream of the shaping apparatus 20 is the entryway to the die in which resin and fabric are combined to form the composite.

FIG. 3 is a view of a sill cover composite member 30. The composite member 30 comprises the glass fabric 31 and a polyvinylchloride resin exterior 32. The planar portion 33 rests on the flat surface of the sill and the shaped portion 34 overlaps the balance of the sill. The composite 33 shows a folded or overlapped portion 35 and 36 at the edge of the composite. FIG. 4 is a view of a substantially rigid structural member that comprises a structural portion of a casement window. The structural member 40 comprises a glass fiber 41 and an exterior of polyvinylchloride 42. The structural member comprises three layers of glass fabric 41, 43 and 44. Each layer of glass fiber has a fold or overlap 45a, 45b or 45c at the periphery of each of the fabric portions. The structural unit comprises a central square stop portion 46 and peripheral runner portions 47 and 47a. Lastly, a structural assembly mold portion 48 is also formed into the multifaceted structural member 40.

FIG. 5 shows a structural member 50 that can be manufactured by welding two single layer composite members 51 and 52 at weld joints 53 and 53a to form a rigid structural member 50. The composite members 51 and 52 comprise a single layer of glass fabric 54 covered by resin 55. Each composite member comprises a fold or overlap 56 at the periphery of the glass fabric in the structural member 51 or 52. The joint 53 can be made by welding using heat, friction or adhesively using a curable adhesive such as a cyanoacrylate, a polyurethane adhesive or equivalents thereto.

FIG. 6 shows a hollow trim casing 60 made by introducing a specific profile shape defined by the cross-section 61 exposed in FIG. 6 into a composite profile. The shape is introduced into the profile by folding fabric edges and forming the fabric 62 into the appropriate shape which is then introduced into a die for combining the fabric with melt resin. The glass fabric is overlapped in a joint 63 formed by contacting the folded portions 64a and 64b in an overlapping fashion. The linear profile has a hollow interior 65 wholly surrounded by the composite material.

FIG. 7a shows an enlarged fragment portion of the overlap section in FIG. 6. In the profile of FIG. 6 an overlap area 63 is created where folded edge 64a and folded edge 64b overlap to form a reliable joint in the resin matrix.

FIG. 7b shows an alternate enlarged fragment portion 70 of the overlap section in FIG. 6. In the profile of FIG. 6 an overlap area 71 is created where folded edge 72a and folded edge 72b interlock to form a reliable joint in the resin matrix.

FIG. 8 is a representation of a structural member of the invention comprising multiple (3–10) layers of fabric in a resin matrix. This structure can be of any arbitrary size. The structure 80 comprises an exterior matrix 81 that surrounds the internal fabric layers 82 and 84. These fabric layers 82 and 84 are shown in the end-view and the cut-out section area. An adhesion layer 83 is also shown between fabric layers 82 and 84. This adhesion layer 83 can comprise the resin matrix or can comprise an adhesive layer that can be a thermoplastic or thermosetting composition.

The following description applies to profiles which combine a single thermoplastic material with the fabric to form the composite.

The tool is mounted at an angle to the extruder, typically at 90° to the lineal axis of extrusion. Fabric enters a preforming area where the fabric is folded and shaped prior to the addition of thermoplastic material. The fabric then enters the extrusion die.

The extruder uses standard thermoplastic materials as used in thermoplastic extrusion. These materials are melted and forced into the die under pressure. The pressures upon entering the tool can vary from 1500 to 8000 psi depending upon the thermoplastic used. For the PVC compounds typically used in experiments, the material was PVC with pressures ranging from 3800 to 5600 psi, and normally measuring 4200 psi upon gate entry.

The melted thermoplastic flows through a runner system and into the segment of the tool which determines the profile shape. It is in this area where the thermoplastic and fabric come into intimate contact under high pressure. It has been found that the pressure must be sufficiently high or the composite formed will not have adequate adhesion between the layers, which can result in poor physical properties (shrink, CTE and elastic modulus) and delamination. The material begins to solidify and exits the tool as a standard extrusion puller pulls the composite out of the tool.

After exit from the extrusion tool, the composite enters a vacuum calibrator system. The purpose of the calibrator is to impart the proper finish and maintain the shape of the profile as it cools and solidifies into final form. The calibrator can be totally or partially immersed in water or air cooled. As the profile is pulled through the calibrator, the material fully solidifies into the final extruded form.

The above description also applies to extruding two thermoplastics and fabric. Two extruders inject thermoplastic from opposite side of the tool and the runner system determines which side(s) of the profile the various materials are applied to in forming the composite. Additional extruders may be added in a similar fashion as warranted by the profile being produce.

The following examples were performed to further illustrate the invention that is explained in detail above. The following information illustrates the typical production conditions and compositions and properties of a structural member made from the resin and fabric.

Sample Preparation

A laboratory scale single screw, 21:1 ratio, Brabender extruder is used to prepare samples of the resin fabric composite.

The resin is combined in the extruder head with fabric (11 to 19% of fabric by weight based on fabric plus resin). To assist processability an additive package is added at 1.5–2 phr (parts per hundred parts of resin).

The polymer mixture is fed to the extruder with a volumetric feeder. The feed rate is adjusted to give a smooth flow of material into and on the fabric. The extruder is run at the following conditions:

| PARAMETER | SETTING |
| --- | --- |
| Barrel Zone 1 Temperature | 190° C. |
| Barrel Zone 2 Temperature | 190° C. |
| Barrel Zone 2 Temperature | 190° C. |
| Adapter Temperature | 190° C. |
| Die Temperature | 187° C. |
| Screw Speed | 25 |
| Puller Rate | 4 ft/min |

The temperatures, feed rates and the screw speeds are adjusted to accommodate the varying flow characteristics of different polymers. After extrusion, about 4 feet length of strips were saved for physical property testing. The resulting PVC/glass fabric composite had a width of 4–10 inches and the extruded material was cut into pieces of 1×12 inches. The material had a single layer of glass fabric. The fiber fabric contained a PVC coating. This material was tested for properties useful in fenestration applications and other applications.

Shrink Rate

Shrink is the difference between a thermoplastics' original length to the length obtained after thermally shocking the part. The test procedure is as follows: A thermoplastic profile is made by extrusion process. Parts are then cut into eleven or twelve inch lengths and a ten inch line scored on the part. The part is placed (unsupported) into a water bath at the boiling point of water (at the test location, this is 205° F.) for five minutes so that the entire part is thermally saturated at 205° F. The part is removed from the bath and immediately placed into another water bath at 70° F. The length between the lines is measured and difference in length recorded as a percentage change from the original length.

The above quantity is important in the construction industry because as dark surfaces heat, they may reach temperatures which exceed the heat deflection temperatures of the materials by solar radiation and then cool. These natural cycles can eventually stress relieve a part which may cause distortion of product.

Geon Fiberloc® and GE Valox® 508 materials were tested for shrink. Both materials are thermoplastic resins with wood or glass fill. A proprietary blend of PVC was also tested along with the fiber mat composite. Results are summarized below.

| Material | Fiberloc ® | Valox ® | PVC | Fiber Mat Composite |
| --- | --- | --- | --- | --- |
| Shrink (%) | 0.38 | 0.08 | 2.3 | 0.21 |

The new fiber mat composite material has shrink rate comparable to the thermoplastic, and is a substantial improvement over the PVC compounds which is one of the ingredients used in its' construction. Because PVC can be used, the comparative cost is less than many costly materials which cost 4 to 10 times the cost of this composite.

Coefficient of Thermal Expansion (CTE)

Tests per ASTM D696

Coefficient of thermal expansion is the amount the material changes in length per unit length per unit temperature. It does not include the shrink rate effects shown above. Thus when a material is heated and then cooled, it returns to its original length. This quantity is important in design of construction components. Parts using dissimilar materials must not bind, twist or bow as temperatures change or fit, form or function may be affected. Below is a comparison of some typical construction materials used in fenestration products.

| Material | PVC Powders | Wood (Ponderosa Pine lengthwise) | ABS Resins | Aluminum | Fiber Mat Composite |
|---|---|---|---|---|---|
| CTE (in/in/° F.) | 3.4–4.0 × 10$^{-5}$ | 0.3 × 10$^{-5}$ | 4–7.7 × 10$^{-5}$ | 1.33 × 10$^{-5}$ | 1.7 × 10$^{-5}$ |

Wood and aluminum represent very common fenestration materials. The fiber mat composite is more compatible with these materials than either PVC or the ABS based thermoplastics with or without glass fill, PVC or other resins, which have about two to four times the CTE the composite does. Large difference in CTE can lead to unintentional exposure as one material contracts past the other, increased stresses between parts which may result in cracking, distortion or failure of adhesives between layers of differing materials or failure of assemblies which may lead to other forms of mechanical failure. The improvement of CTE compatibility of wood or aluminum with the composite helps in reducing problems which can be associated with large differences in CTE.

Thermal Cycling

Cycle parts in immersion air chamber between 180° F. and −20° F. three times daily. Twenty minimum cycles to 200 maximum cycles.

Parts thermal cycled and observed distortion was minimal. Standard PVC parts of the same configuration will shrink, warp, bow and twist and lose contact with base parts when used as cladding for those parts. Observations made using thermal cycle tests agree with the data, observations and analysis described above.

Impact

Test method ASTM (TBD)

| | PVC Powders | Wood (Ponderosa Pine lengthwise) | ABS Resins | Fiber Mat Composite |
|---|---|---|---|---|
| Material | | | | |
| Impact (in-lb) Mechanical Property | 20 | N/A | 7 (Notched) | 14 |
| Modulus of Elasticity (KPSI) | 300 | 997 | 1500 | 830 |
| Tensile Strength (KPSI) | 6.4 | 5.1 (Modulus of Rupture) | 27 | 14 |
| Yield Strength (PSI) | 6.4 | N/A | 27 | 14 |
| Elongation at Yield (%) | N/A | | 2 | 2.8 |

These data show the thermoplastic/glass fabric composite of the invention as a superior material in applications such as building components and in particular fenestration units.

The above specification test data and examples provide a basis for understanding the means and bounds of the invention, however, the invention can have many embodiments which do not depart from the spirit and scope of the invention. The invention is embodied in the claims hereinafter appended.

We claim:

1. A process for the manufacture of a shaped structural member composite comprising a thermoplastic resin and a glass fabric, the method comprising:
   (a) providing a glass fabric;
   (b) introducing the glass fabric into a shaping station to introduce a prefold into an edge of the glass fabric, and to produce a preformed fabric shape conforming to a shape of a shaped composite;
   (c) introducing a thermoplastic resin and the preformed fabric into an extruder having an inlet zone and a combining zone wherein the thermoplastic resin and preformed fabric shape are combined to form a resin and fabric composite under conditions of sufficient pressure, temperature and shear to cause the thermoplastic resin composition to penetrate and wet individual glass fibers to the extent that the thermoplastic resin composition substantially coats the glass fibers in the glass fabric; and
   (d) extruding the resin and fabric composite through a shaping die to form the shaped structural member composite wherein the shaped structural member composite has properties which are:
      (i) modulus of elasticity of about 830 kpsi or greater;
      (ii) coefficient of thermal expansion of about 0.000022 in/in/° F. or less;
      (iii) shrinkage not to exceed about 0.28%; and
      (iv) impact strength of about 10 in-lbs or greater.

2. The process of claim 1 wherein each listed property has a standard deviation that does not differ by more than ±12% of a mean value of each listed property.

3. The process of claim 1 wherein the shaped structural member composite comprises about 5 to 50 parts by weight of glass fabric and about 50 to 95 parts by weight of thermoplastic resin per each 100 parts by weight of the shaped structural member composite.

4. The process of claim 1 wherein the structural member composite comprises a hollow composite.

5. The process of claim 4 wherein the glass fabric has two edges overlapping with each other having an overlap of 5 cm or less.

6. The process of claim 1 wherein the shaped structural member composite comprises about 70 to 90 parts by weight of a thermoplastic resin and about 10 to 30 parts by weight of a glass fabric.

7. The process of claim 1 wherein the glass fabric comprises a plain weave fabric comprising about 5–20 ounces of fabric per square yard.

8. The process of claim 7 wherein the plain weave fabric is a 5–15 pick fabric.

9. The process of claim 1 wherein the glass fabric comprises glass fibers having a surface coating thereon.

10. The process of claim 9 wherein the surface coating comprises a PVC coating.

* * * * *